(12) United States Patent
Yoon

(10) Patent No.: US 11,542,990 B2
(45) Date of Patent: Jan. 3, 2023

(54) POWER TRANSMISSION DEVICE INTERLOCKING WITH ACCELERATOR AND BRAKE PEDAL

(71) Applicant: AUTODYN SYS INC., Incheon (KR)

(72) Inventor: Jongyun Yoon, Incheon (KR)

(73) Assignee: AUTODYN SYS INC., Incheon (KR)

( * ) Notice: Subject to any disclaimer, the term of this patent is extended or adjusted under 35 U.S.C. 154(b) by 0 days.

(21) Appl. No.: 17/432,290

(22) PCT Filed: Jul. 20, 2020

(86) PCT No.: PCT/KR2020/009550
§ 371 (c)(1),
(2) Date: Aug. 19, 2021

(87) PCT Pub. No.: WO2021/071068
PCT Pub. Date: Apr. 15, 2021

(65) Prior Publication Data
US 2022/0126687 A1    Apr. 28, 2022

(30) Foreign Application Priority Data

Oct. 8, 2019   (KR) .................. 10-2019-0124670
Dec. 13, 2019  (KR) .................. 10-2019-0166488

(51) Int. Cl.
*F16D 23/12*   (2006.01)
*B60K 23/02*   (2006.01)
*B60K 26/04*   (2006.01)
*F16D 43/02*   (2006.01)

(52) U.S. Cl.
CPC .............. *F16D 23/12* (2013.01); *B60K 23/02* (2013.01); *B60K 26/04* (2013.01); *F16D 43/02* (2013.01)

(58) Field of Classification Search
CPC ......... B60K 23/02; B60K 26/04; F16D 23/12; F16D 43/02; F16D 2500/31426; F16D 2500/3144; B60W 2540/10; B60W 2540/12
USPC ................................... 477/171–172
See application file for complete search history.

(56) References Cited

U.S. PATENT DOCUMENTS

| | | | |
|---|---|---|---|
| 5,020,645 A * | 6/1991 | Sasa ................ | B60W 30/18063 477/34 |
| 2022/0128103 A1* | 4/2022 | Yoon ..................... | F16D 23/14 |
| 2022/0128104 A1* | 4/2022 | Yoon ..................... | F16D 15/00 |
| 2022/0154779 A1* | 5/2022 | Yoon ..................... | F16D 23/14 |

FOREIGN PATENT DOCUMENTS

| | | |
|---|---|---|
| JP | 2009-275805 A | 11/2009 |
| KR | 20-0313732 Y1 | 5/2003 |
| KR | 20-0319147 Y1 | 7/2003 |
| KR | 10-1916551 B1 | 11/2018 |
| WO | 2013/168940 A1 | 11/2013 |

OTHER PUBLICATIONS

Machine Translation of KR 200313732 Y1 (Year: 2003).*

* cited by examiner

*Primary Examiner* — David R Morris
(74) *Attorney, Agent, or Firm* — Korus Patent, LLC; Seong Il Jeong

(57) ABSTRACT

According to the present invention, a power transmission device of a clutch system can transmit power to precisely control and operate a clutch assembly, in conjunction with pressing and releasing of an accelerator pedal and a brake pedal.

5 Claims, 7 Drawing Sheets

POWER TRANSMISSION DEVICE INTERLOCKING WITH ACCELERATOR AND BRAKE PEDAL

FIELD OF THE INVENTION

The present invention relates to a power transmission device interlocking with an accelerator and a brake pedal that is required to embody a novel clutch system, which has a different structure and operation from that of a conventional clutch system, and more specifically to a power transmission device that is connected to an accelerator and a brake pedal in a state of acceleration or brake and can precisely control and operate a clutch assembly.

BACKGROUND OF THE INVENTION

The wheels of the vehicle rotate in such way that rotations of the engine are changed in the transmission through the flywheel and clutch discs, and transmitted to the main shaft.

In case of manual transmission vehicles, the connection or disconnection of the flywheel and disc is achieved by the clutch pedal installed on the upper floor of the left side of the driver's seat. When the clutch pedal is pressed, the connection between the two members is cut off; when the pedal is released, the two member are connected. When the driver presses the clutch pedal, shifts the gear in a state of pressing the clutch, and then slowly takes the foot off the pedal, the vehicle becomes in a state of a semi-clutch, which is about to come into contact between the flywheel and disk.

In case of automatic transmission vehicles, the vehicles do not have a clutch pedal, and are driven by detecting rotations of the engine, speed of the vehicle, and automatically shifting the transmission depending on the vehicle loads. The vehicle consists of the torque converter, the oil pump, the hydraulic clutch, the planetary gear set, the rotary sensor, the deceleration gear, and the valve body. The transmission part consists of a combination of the planetary gear set, the wet multi-plate clutches, and the brake.

Manual and automatic transmission vehicles have developed by imitating strengths of each other. For example, manual transmission vehicles have adopted the automatic control algorithms of the automatic transmission; automatic transmission vehicles have partially adopted the mechanical friction clutch of the manual transmission for improving fuel efficiency. However, the design structures of the manual and automatic transmission vehicles have retained the first developed platforms, respectively.

In case of automatic transmission vehicles, they have to be switched in conjunction with the clutch pedal at the same time; thus, there is a low preference in South Korea and North America due to slipping when re-starting on ramps. Accordingly, it is necessary to develop a system that enables transmission without a clutch pedal and that prevents slipping on ramps.

In case of automatic transmission vehicles, they have a low fuel efficiency due to the torque transmission through fluid, and are vulnerable to a torque short that is transferred into the transmission from the engine in the abnormal event such as a sudden unintended acceleration. Accordingly, it is necessary to develop a system that eliminates possibilities of a sudden unintended acceleration by mechanically operating states of acceleration, semi-clutch, and stop.

DETAILED DESCRIPTION OF THE INVENTION

Technical Problems

Accordingly, the present invention is suggested to provide a novel clutch system that ensures a 100% torque transmission rate between an engine and a transmission in a vehicle system, can be commonly applied to conventional manual transmission and automatic devices, and operates by interlocking with an accelerator and a brake pedal.

SUMMARY OF THE INVENTION

To solve the problems mentioned above, the present invention provides a power transmission device for a vehicle having an accelerator pedal and a brake pedal, the power transmission device comprising: a driving bar mounted inside and interlocking with the accelerator pedal and the brake pedal, wherein the vehicle is in any one state of pressing the accelerator pedal, releasing the accelerator pedal, pressing the brake pedal, and releasing the brake pedal, wherein the driving bar moves to each position corresponding to each of the state.

The power transmission device may include an accelerator actuator connected to a cable of the accelerator pedal to operate, and a brake actuator connected to a cable of the brake pedal to operate and facing the accelerator actuator, wherein the driving bar may move to each position corresponding to each of the state by operation of each of the actuators.

The driving bar may be connected to a connection member connected to a driving shaft that transmits power to a clutch assembly.

When a driver presses the accelerator pedal, the driving bar of the transmission device may move in a first direction by operation of the accelerator actuator; when the accelerator pedal is released, the driving bar of the power transmission device may move in a second direction that is opposite to the first direction by releasing of the accelerator actuator; when the driver presses the brake pedal, the driving bar of the power transmission device may move in the second direction by operation of the brake actuator; and when the brake pedal is released, the driving bar of the power transmission device may move in the first direction by releasing of the brake actuator.

In addition, the present invention provides a power transmission device for a vehicle having an accelerator pedal and a brake pedal, the power transmission device comprising: an accelerator actuator connected to a cable of the accelerator pedal to operate; a brake actuator connected to a cable of the brake pedal to operate and facing the accelerator actuator, and a driving bar moving in a first direction or a second direction in conjunction with operation of each of the actuators, wherein the driving bar can move to any one of: a first position when the accelerator pedal is pressed; a second position when the accelerator pedal is released; a third position when the brake pedal is pressed, and a fourth position when the brake pedal is released.

The driving bar may be placed in the first position, the second position, the fourth position, and the third position in order, from the first direction.

The fourth position may be placed more to the first direction than to the third position, thereby converting a clutch assembly to a state of a semi-clutch.

Technical Effects of the Invention

The power transmission device of the clutch system of the present invention can expand the base of manual transmission vehicles with simplified transmission, and enables accurate and permanent uses by interlocking with the accelerator and brake pedal.

In addition, the power transmission device of the clutch system of the present invention mechanically operates power transmission, thereby preventing sudden unintended acceleration and enabling protection of both drivers and pedestrians.

Furthermore, the power transmission device of the present invention can be applied to all vehicles. In case of hybrid cars, the power transmission device can replace the main component that transmits power generated from the internal combustion engines at the point that the internal combustion engine operates. In addition, the power transmission device can be applied to the components that require power transmission in a large system such as electric vehicles and other power plants, which uses the internal combustion engines.

DETAILED DESCRIPTION EMBODIMENTS OF THE INVENTIONS

Hereafter, the present invention will be described in detail in conjunction with the accompanying drawings. All terms used in the specification and claims may not be limited to be interpreted as definitions in a generally-used dictionary, and may be defined according to the inventive concept of the present invention. The embodiments in the specification and structures shown in drawings are embodiments of the present invention, and are not restricting or limiting the scopes of the inventive concepts of the present invention.

Figure 1:
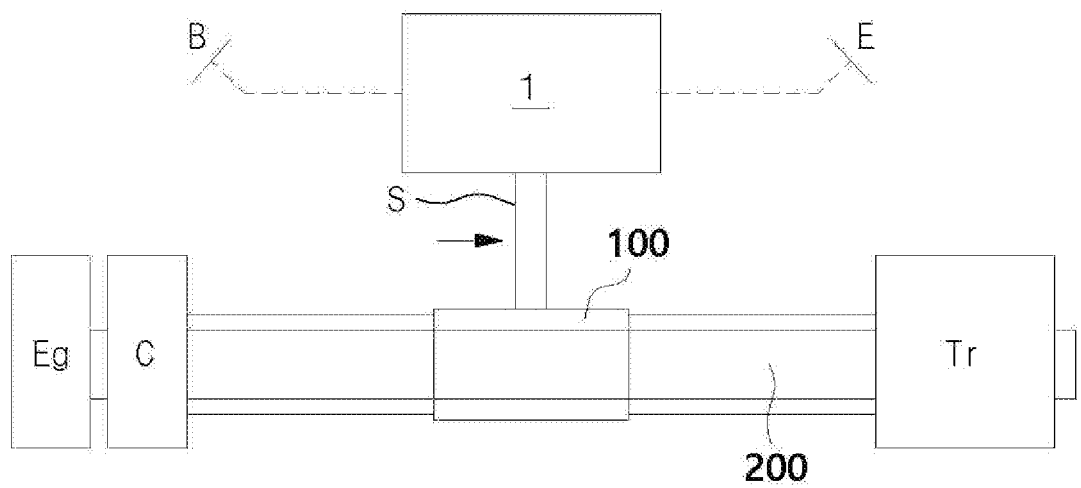
FIG. 1 is a schematic drawing of a clutch system of the present invention.

FIG. 1 is a schematic drawing of a clutch system of the present invention.

The clutch system comprises an engine Eg, and a clutch assembly C connected or disconnected to the engine Eg. An input shaft 200 connects between the clutch assembly C and a transmission Tr. The configurations and functions of the engine Eg, the transmission Tr, and the input shaft 200 have been already disclosed; however, any of the conventional or newly developed ones can be used.

The location and state of the clutch assembly C are changed by pressing or releasing an accelerator pedal E, or pressing or releasing a brake pedal B. A power transmission device 1 and a driving shaft 100 are provided to transmit a state of pressing or releasing of the accelerator pedal and the brake pedal E, B to the clutch assembly C. The power transmission device 1 and the driving shaft 100 are connected to each other through a connection member S such as rod. The operation of the power transmission device 1 is transmitted to the driving shaft 100, and the operation of the driving shaft 100 is transmitted to the clutch assembly C. The driving shaft 100 is not connected to the transmission Tr. One side of the power transmission device 1 interlocks with the accelerator pedal E through a certain part, a cable for example, and the other side of the power transmission device 1 interlocks with the brake pedal B.

Figure 2:
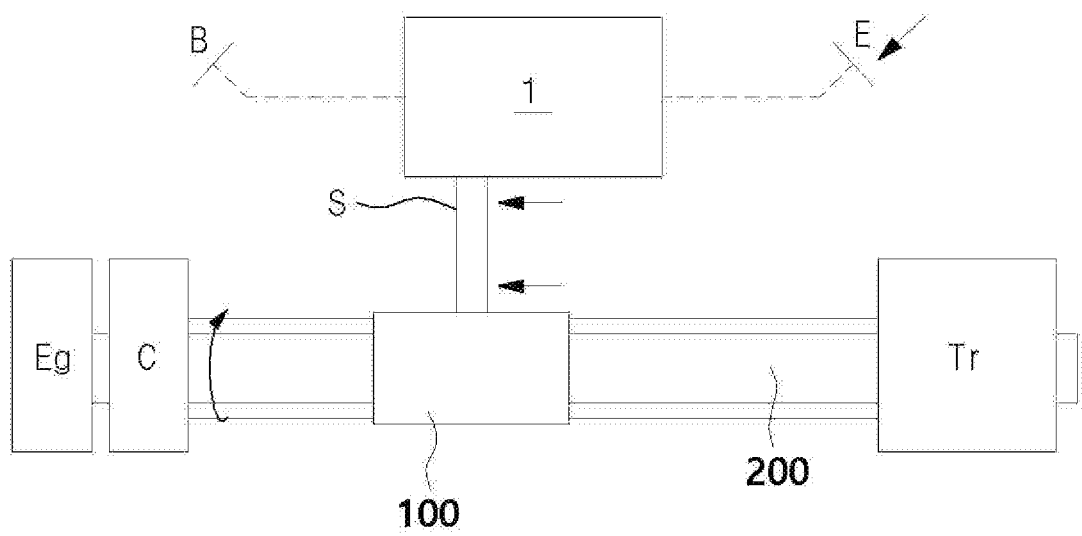
FIG. 2 is a schematic drawing of the clutch system when a driver presses an accelerator pedal.

FIG. 2 is a schematic drawing of the clutch system when the driver presses the accelerator pedal E.

When the driver presses the accelerator pedal E, the connection member S linearly moves to a first direction of FIG. 2, to the left side for example, according to the operation of the power transmission device 1. Then, the driving shaft 100 linearly moves to the left side, and the linear motion of the driving shaft 100 is converted to rotary motion of the clutch assembly C. Accordingly, the clutch assembly C transitions to "a first state". In the first state, the clutch assembly C transmits the rotational force of the engine Eg to the transmission Tr through the input shaft 200. When the driver keeps pressing the accelerator pedal E, the increased rotational force of the engine Eg is transmitted to the transmission Tr, and the clutch assembly C maintains the first state.

Figure 3:
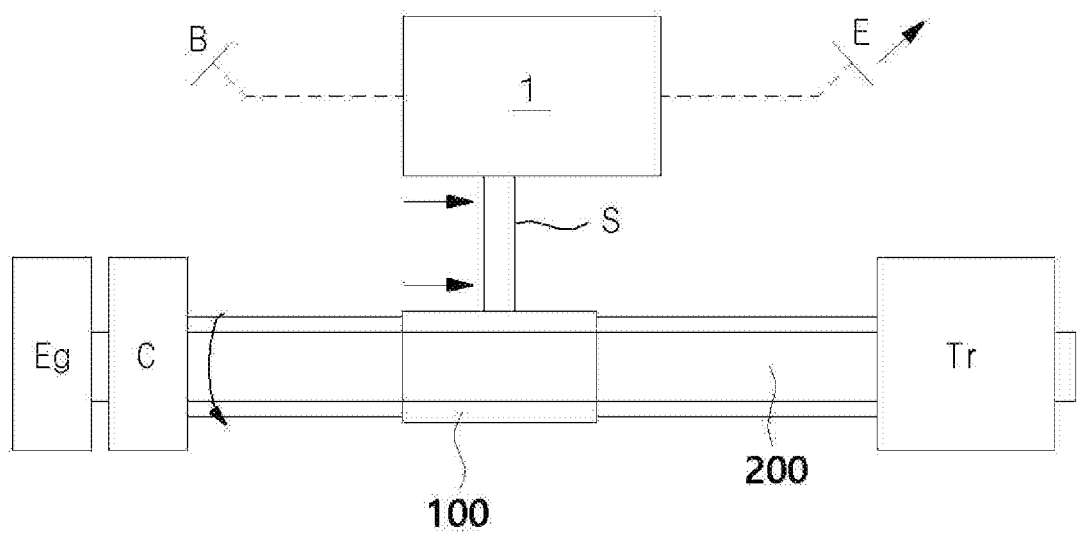
FIG. 3 is a schematic drawing of the clutch system when the driver releases the accelerator pedal from the state shown in FIG. 2.

FIG. 3 is a schematic drawing of the clutch system when the driver releases the accelerator pedal E from the state shown in FIG. 2.

When the driver releases the accelerator pedal E, the connection member S linearly moves a bit to a second direction of FIG. 3, to the right side for example, according to the operation of the power transmission device 1. Then, the driving shaft 100 linearly moves a bit to the right side, and the linear motion of the driving shaft 100 is converted to rotary motion of the clutch assembly C, which rotates in an opposite direction to a direction that the clutch assembly C rotates in FIG. 2. In this instance, the location of the clutch assembly C is different from that in the first state; however, "a second state", in which the clutch assembly C transmits the rotational force of the engine Eg to the transmission Tr through the input shaft 200, keeps the same.

In general, the clutch has a function of connecting between the engine and the transmission when the accelerator pedal E is either pressed or released. In this respect, the functions of clutch assembly C in FIGS. 2 and 3 may be essentially the same.

Figure 4:
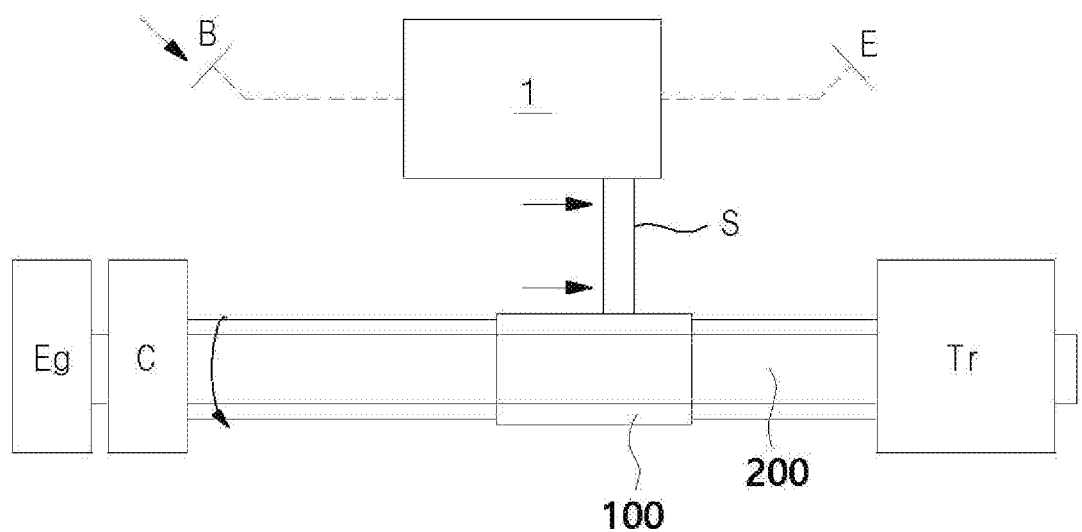
FIG. 4 is a schematic drawing of the clutch system when the driver presses the brake pedal from the state shown in FIG. 3, the state that the driver releases the accelerator pedal.

FIG. 4 is a schematic drawing of the clutch system when the driver presses the brake pedal B from the state shown in FIG. 3. The state shown in FIG. 3 refers to when the driver releases the accelerator pedal E.

When the driver presses the brake pedal B, the connection member S linearly moves to the second direction of FIG. 4, to the right side for example, according to the operation of the power transmission device 1. Then, the driving shaft 100 linearly moves to the right side, and the linear motion of the driving shaft 100 is converted to rotary motion of the clutch assembly C, which rotates in an opposite direction to the direction shown in FIG. 2. In this instance, the clutch assembly C transitions to "a third state". In the third state, the clutch assembly C cuts off the connection between the engine Eg and the input shaft 200, and does not transmit power to the transmission Tr. The difference from the state shown in FIG. 3 is that the connection member S of the power transmission device 1 moves further to the right side. The clutch assembly C rotates further to the same direction as shown in FIG. 3, and transitions to the definite cut-off state, in which the rotational force of the engine Eg is not transmitted to the input shaft 200.

Figure 5:
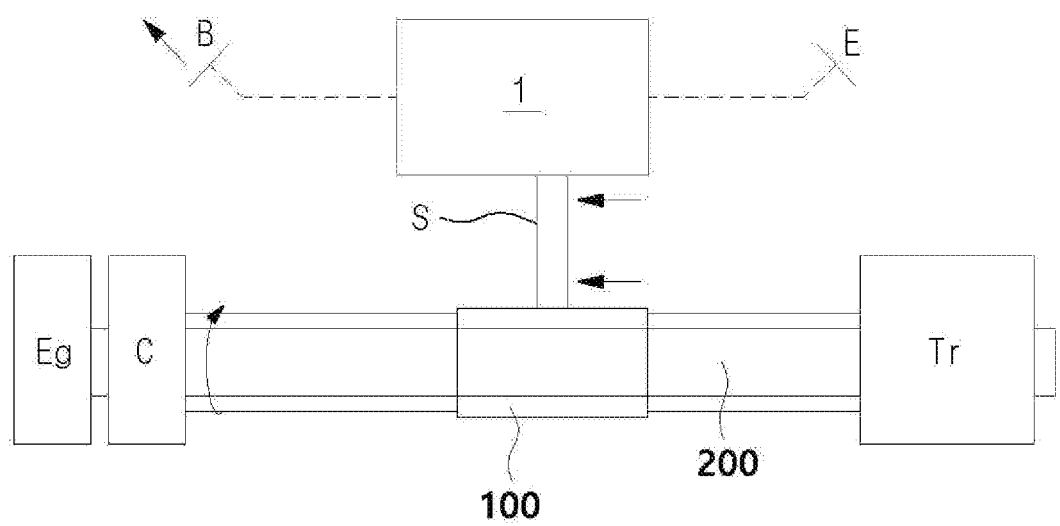
FIG. 5 is a schematic drawing of the clutch system when the driver releases the brake pedal from the state shown in FIG. 4, the state that the driver presses the brake pedal.

FIG. 5 is a schematic drawing of the clutch system when the driver releases the brake pedal B from the state shown in FIG. 4. The state shown in FIG. 4 refers to when the driver presses the brake pedal B.

When the driver releases the brake pedal B, the connection member S linearly moves a bit to the first direction of FIG. 2, to the left side for example, according to the operation of the power transmission device 1. Then, the driving shaft 100 linearly moves a bit to the left side, and the linear motion of the driving shaft 100 is converted to rotary motion of the clutch assembly C in the same direction as the direction shown in FIG. 2. In this instance, the clutch assembly C is converted to "a fourth state", a so-called semi-clutch state, in which the flywheel of the engine Eg is about to come into contact with disk. The term "semi-clutch state" in the present invention is used to indicate an initial, unstable state of transmission from a rotational force of the engine Eg to the transmission Tr. Even though the term "semi-clutch state" in the present invention uses the same word "semi-clutch state" referring to a state, in which a clutch pedal in a manual vehicle is released, the "semi-clutch state" in the present invention is fundamentally different from that in manual vehicles in that the brake pedal B is released in the "semi-clutch state" in the present invention. Hereafter, "semi-clutch state" will be referred to as a transition state or an intermediate state.

To drive the vehicle, the driver starts the vehicle, pressing the brake pedal B, and presses the accelerator pedal E after releasing the brake pedal B. In this case, the states of the clutch system sequentially transition as shown in FIGS. 4, 5, and 2. In other words, the clutch system sequentially transitions to the state of a cut-off between the engine Eg and the transmission Tr; a state of an initial power transmission, a semi-clutch state or transition state; and a state of a power connection between the engine Eg and the transmission Tr. When the driver repetitively presses and the releases the accelerator pedal E and the brake pedal B while driving, the clutch system also transitions to any one state of FIGS. 2 to 5 or keeps the previous state. The clutch system can eliminate a clutch pedal of a manual vehicle, and can be applied to all kind of vehicles including manual and automatic vehicles.

In addition, the connection member S is placed in locations shown in FIGS. 2, 3, 4, and 5 in order. In other words, when the accelerator pedal is pressed for driving, the connection member S is placed on the left side, in the first direction. When the brake pedal is pressed for reducing speed or stopping, the connection member S is placed on the right side, in the second direction.

As mentioned above, the power transmission device 1 shown as a box in drawings in the present invention may be embodied with any type of structure that can move the connection member S in conjunction with the accelerator pedal E and the brake pedal B. Embodiments shown in FIGS. 6 to 9 are provided to assist those of ordinary skill in the art in a comprehensive understanding of the present invention, and do not limit the scopes of the inventive concepts of the present invention.

The power transmission device 1 may be defined as a rectangular box shape as an external shape. The box may be defined by a long rectangular frame 2 as illustrated. On the right side of the frame 2, an accelerator actuator E1 connected to a hydraulic line of the accelerator pedal E is installed, and on the left side, a brake actuator B1 connected to a hydraulic line of the brake pedal B is installed. A first head 22 is installed on the front side, the left side in FIG. 6, of a screw-shaped rotary shaft connected to the accelerator actuator E1, and a second head 32 is installed on the front side, the right side in FIG. 6, of the rotary shaft of the brake actuator B1. A first and second spring S1, S2 having cylindrical shapes are installed between the first and the second head 22, 32. The first and second head 22, 32 may be pressurized bolts for example.

Figure 6:
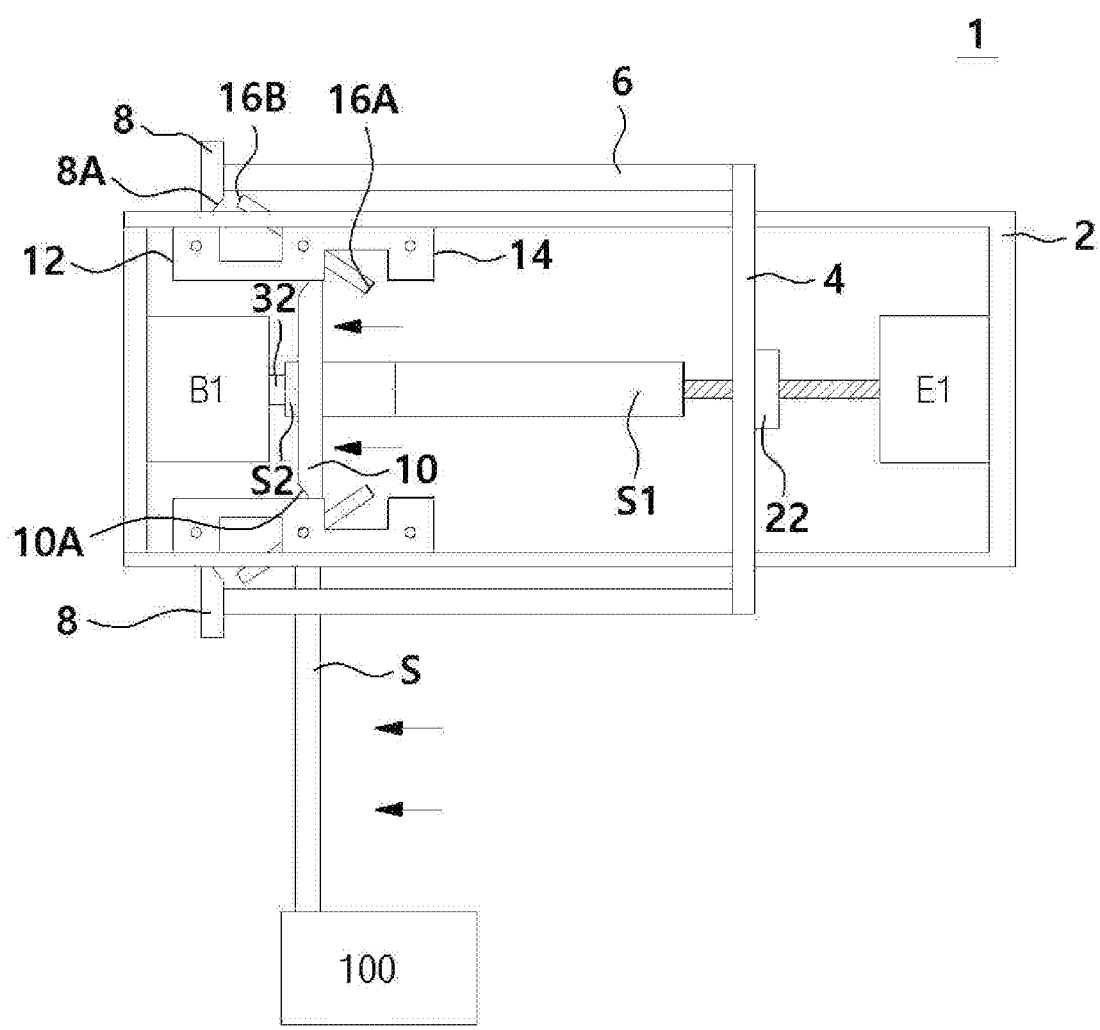
FIG. 6 is a schematic drawing of a power transmission device of the present invention when the accelerator pedal is pressed.

In FIG. 6, a moving bar 4 is installed across the frame 2 so that the first head 22 comes into contact with a center part of the moving bar 4, and a pair of side bars 6 respectively extend in parallel from each of a top and bottom end of the moving bar 4 toward the left side of FIG. 6 outside the frame 2. Guides 8, such as wedge, are attached to the other ends of the side bars 6, respectively. A lower portion of the guide 8 forms an oblique slope 8A.

A first support 12 having a shape of "⊔" and a second support 14 having a shape of "⊓" are formed continuously on both of the top and bottom of the left side inside the frame 2. A rotary bar 16 protrudes outward through the first support 12, the inner space of the first support 12, and frame 2. An upper portion of a rotary bar 16 forms a first slope 16B, which corresponds with the slope 8A of the lower portion of the guide 8. A lower portion of the rotary bar 16, which is placed toward the inside, also forms an oblique second slope 16A.

In the present invention, a driving bar 10 is installed vertically inside the frame 2, and the right side of the driving bar 10 comes in contact with the first spring S1, and the left side comes in contact with the second spring S2. The front sides, the left sides in FIG. 6, of both upper and lower end of the driving bar 10 are cut and form oblique slopes 10A that correspond to the second slopes 16A of the lower portion of the rotary bars 16. The lower or lateral side of the driving bar 10 is connected to the connection member S although not illustrated in FIG. 6.

The above describes the basic configuration of the power transmission device 1. Especially, FIG. 6 illustrates the operation of the power transmission device 1 when the driver presses the accelerator pedal E. In other words, when the driver presses the accelerator pedal E, the accelerator actuator E1 is operated by a hydraulic pressure introduced through the hydraulic line, and thus, the first head 22 moves to the left side. Accordingly, as the moving bar 4 and the side bar 6 move together to the left side, and the guide 8 of the side bar 6 hits the rotary bar 16 from the back side, the rotary bar 16 rotates counterclockwise to allow the driving bar 10 to move to the left side. The driving bar 10 is pressurized by the first spring S1 to move to the position illustrated in FIG. 6 while beating the elastic force of the second spring S2 and pressurizing the second spring S2. The flat surfaces of the upper and lower end of the driving bar 10 are in contact with the inner surfaces of the first supports 12 formed in the top and the bottom side of the frame 2, respectively. In this instance, the connection member S moves to the left side, and the clutch assembly rotates to become in the first state through the driving shaft 100.

Figure 7:
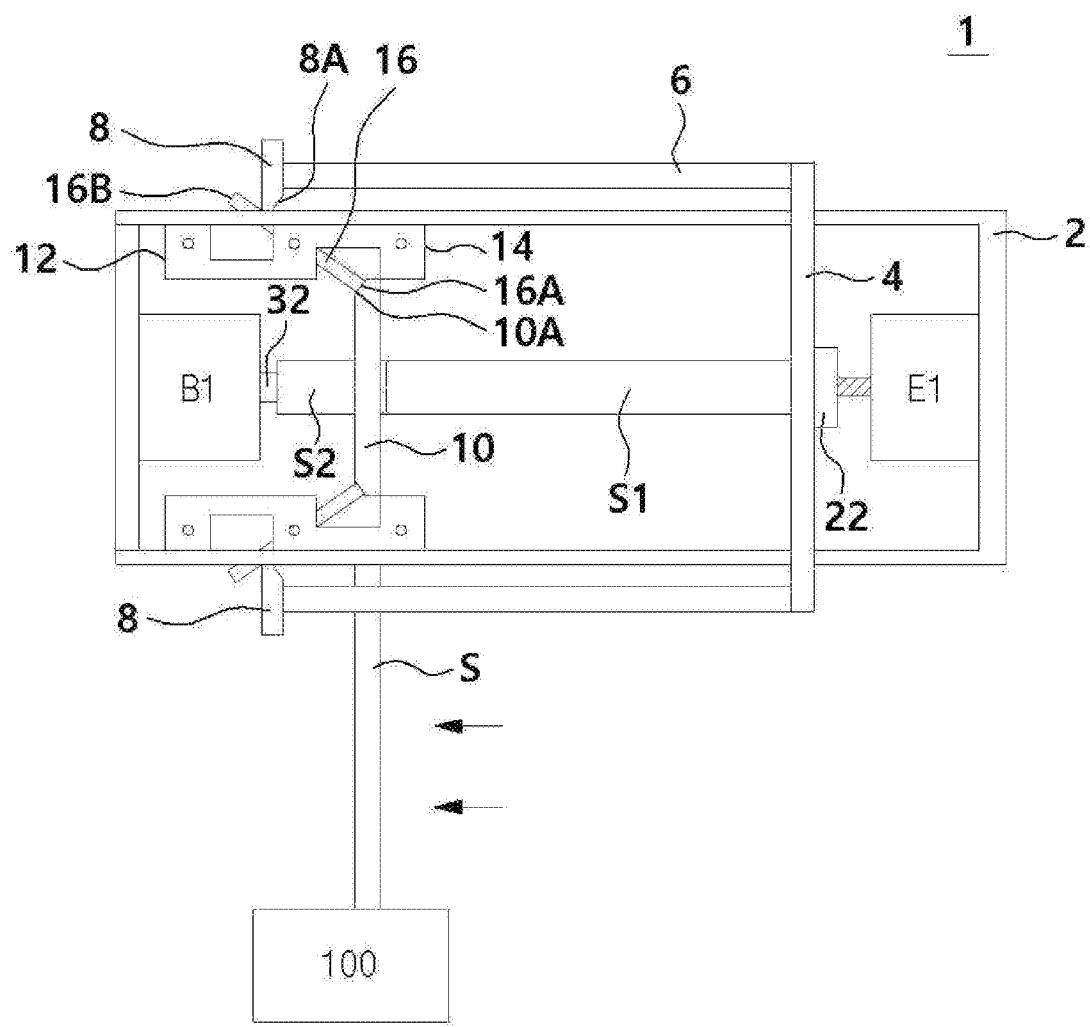
FIG. 7 is a schematic drawing of the power transmission device when the accelerator pedal is released.

When the driver releases the accelerator pedal E from the state shown in FIG. 6, the operation of the accelerator actuator E1 stops, and the pressurizing force of the first spring S1 is released. Accordingly, the second spring S2 starts pushing the driving bar 10 to the right side. As the driving bar 10 moves to the right side, the moving bar 4 and the side bar 6 also move in the same direction; however, the slope 8A of the guide 8 interferes with the first slope 16B of the side bar 6, and the guide 8 stops the movement of the side bar 6 at the position where it can no longer move. This state is illustrated in FIG. 7. In this position, the movement of the driving bar 10 stops in a state that the driving bar 10 is moved slightly to the right side. The connection member S is also moved to the right side by the moving distance of the driving bar 10. Accordingly, the clutch assembly rotates to the position corresponding to the releasing state of the accelerator pedal E through the driving shaft 100, and becomes in the secondary state.

When the driver presses the brake pedal B from the state shown in FIG. 7, the brake actuator B1 is operated by a hydraulic pressure introduced through the hydraulic line, moving the second head 32 further to the right side. Accordingly, the moving bar 4 and the side bar 6 move together to the right side, and the driving bar 10 is pressurized by the second spring S2 to move to the position shown in FIG. 8 while beating the elastic force of the first spring S1 and pressing the first spring S1. The flat surfaces of the upper and lower end of the driving bar 10 are in contact with the inner surfaces of the second supports 14 formed in the top and the bottom side of the frame 2, respectively. The connection member S moves to the right side, and accordingly, the clutch assembly rotates to the position corresponding to the pressing state of the brake pedal B through the driving shaft 100, and becomes in the third state.

Figure 8:
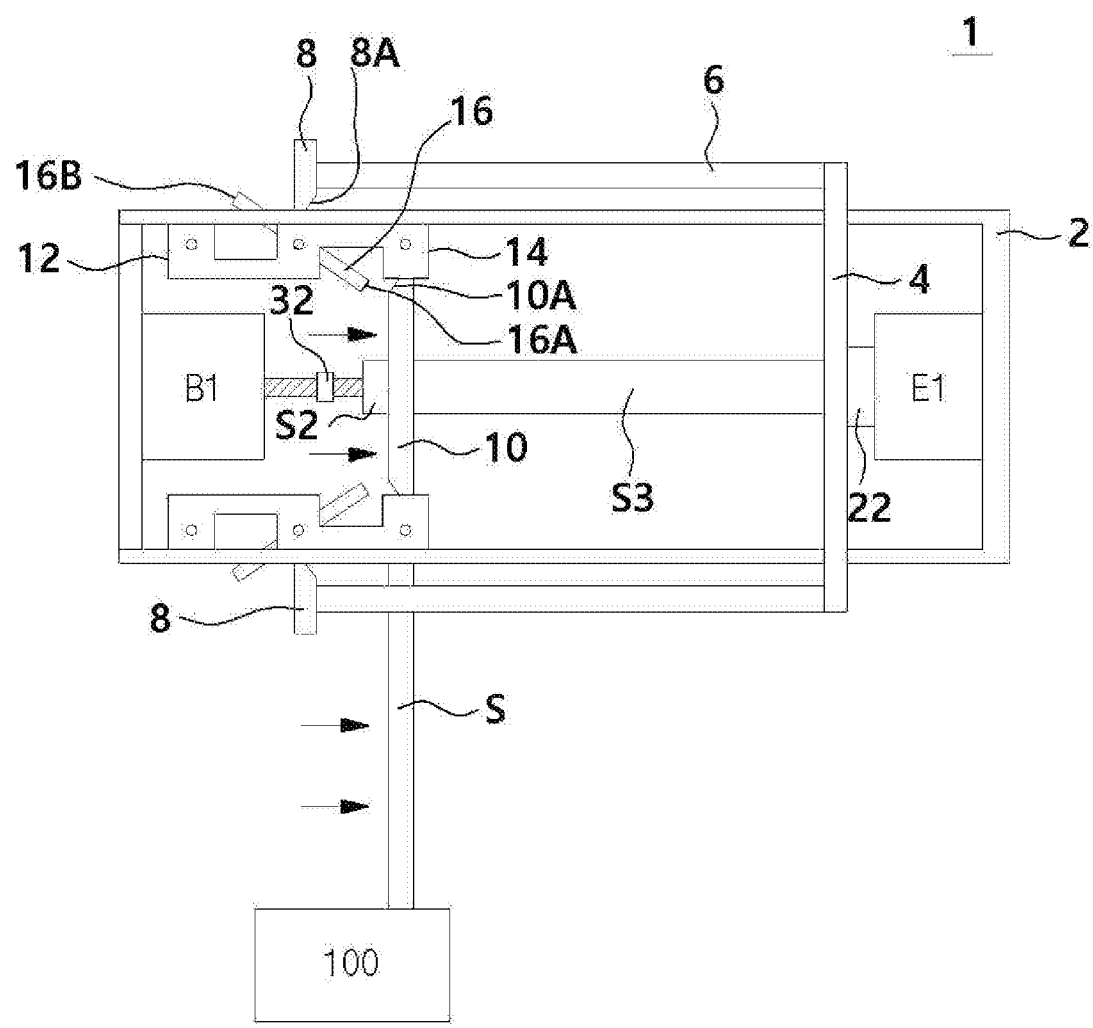
FIG. 8 is a schematic drawing of the power transmission device when the brake pedal is pressed.

When the driver releases the brake pedal B from the state shown in FIG. 8, the driving bar 10 is moved to the left side as shown in FIG. 6.

The connection member S also moves to the left side by the moving distance of the driving bar 10. Accordingly, the clutch assembly rotates to the position corresponding to the releasing state of the brake pedal B through the driving shaft 100, and becomes in the fourth state.

Figure 9:
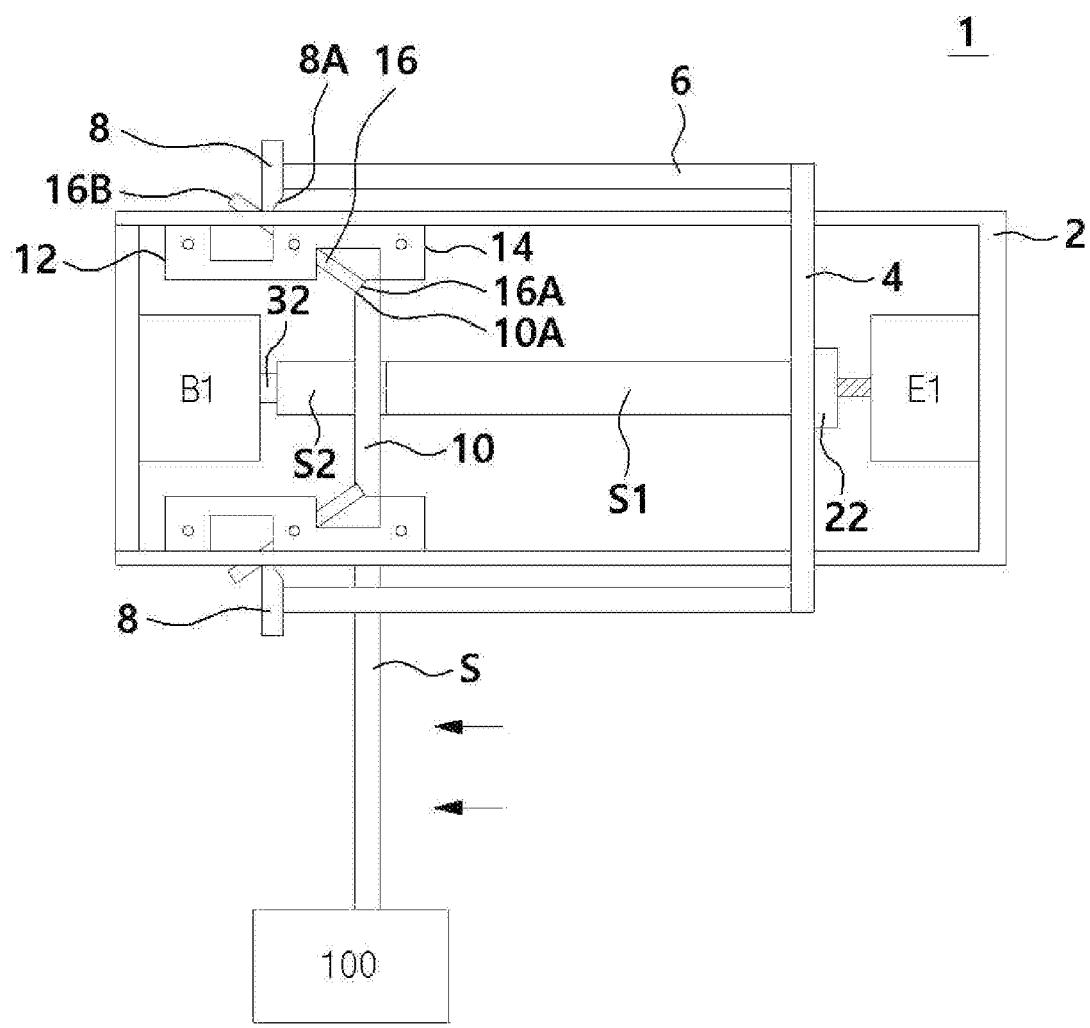
FIG. 9 is a schematic drawing of the power transmission device when the brake pedal is released from the state shown in FIG. 8.

Thus, referring to FIGS. 6, 7, 8, and 9 together, the driving bar 10 can be placed in the accelerator pedal pressing position shown in FIG. 6, the accelerator pedal releasing position shown in FIG. 7, the brake pedal releasing position shown in FIG. 9, and the brake pedal pressing position shown in FIG. 8. If the driver presses the brake pedal B to start driving the vehicle, releases the brake pedal B, and then presses the accelerator pedal E, then the power transmission 1 sequentially becomes in the states shown in FIGS. 8, 9 and 7. Accordingly, the clutch assembly C sequentially transitions to the state of the cut-off between the engine Eg and the transmission Tr; the state of the initial power transmission, the semi-clutch state or transition state; and the state of the power connection between the engine Eg and the transmission Tr.

The power transmission device 1 and connection member S described above can be modified in various forms. The connection member S mentioned above is a rod-shaped linear member, but can be replaced by a link apparatus or a push apparatus with a trigger on the tip. The parts in the power transmission device 1, such as the frame 2, the moving bar 4, the first and second spring S1, S2, may also be replaced or modified if the driving bar 10 can be moved to each of the left and right positions according to the operation of the two actuators.

While embodiments of the present invention have been described, the present invention is not limited to what has been particularly shown.

What is claimed is:

1. A power transmission device for a vehicle having an accelerator pedal and a brake pedal, the power transmission device comprising:
    a driving bar interlocking with the accelerator pedal and the brake pedal,
    wherein the vehicle is in any one state of pressing the accelerator pedal, releasing the accelerator pedal, pressing the brake pedal, and releasing the brake pedal,
    wherein the driving bar moves to each position corresponding to each of the state,
    wherein the power transmission device includes:
    an accelerator actuator connected to a cable of the accelerator pedal to operate, and
    a brake actuator connected to a cable of the brake pedal to operate and facing the accelerator actuator,
    wherein the driving bar moves to each position corresponding to each of the state by operation of each of the actuators,
    wherein when a driver presses the accelerator pedal, the driving bar of the transmission device moves in a first direction by operation of the accelerator actuator;
    when the accelerator pedal is released, the driving bar of the power transmission device moves in a second direction that is opposite to the first direction by releasing of the accelerator actuator;
    when the driver presses the brake pedal, the driving bar of the power transmission device moves in the second direction by operation of the brake actuator; and
    when the brake pedal is released, the driving bar of the power transmission device moves in the first direction by releasing of the brake actuator,
    wherein an external shape of the power transmission device is defined as a rectangular-shaped frame;
    the accelerator actuator is installed on a right side of the frame, and the brake actuator is installed on a left side of the frame;
    wherein a first head is installed on a rotary shaft connected to the accelerator actuator, a second head is installed on a rotary shaft of the brake actuator, and a first and a second spring are installed between the first and the second head;
    wherein a moving bar is installed across the frame to come in contact with the first head, and a pair of side bars respectively extend in parallel from each of a top and bottom end of the moving bar;
    wherein guides are attached to the other ends of the side bars, respectively, and a lower portion of the guide forms an oblique slope;
    wherein a first support and a second support are formed continuously on a left region inside the frame, the first support is mounted to the frame at two radial extensions axially spaced from one another, and the two radial extensions are connected to each other by a first axially extending connection member, while the second support is mounted to the frame by a second axially extending connection member, and the second support includes two radial extension members extending radially from each axial end of the second axially extending connection member;

wherein a rotary bar protrudes outward through the first support, the inner space of the first support, and the frame; an upper portion of the rotary bar forms a first slope that corresponds with the slope of the lower portion of the guide; and a lower portion of the rotary bar is placed toward the inside also forms an oblique second slope.

2. The power transmission device of claim 1, wherein the driving bar is connected to a connection member connected to a driving shaft that transmits power to a clutch assembly.

3. The power transmission device of claim 1, wherein the driving bar is installed vertically inside the frame, one side of the driving bar comes in contact with the first spring, and the other side of the driving bar comes in contact with the second spring, wherein front sides of both upper and lower end of the driving bar are cut and form oblique slopes that correspond to the second slopes of the rotary bars.

4. The power transmission device of claim 3, wherein when the accelerator pedal is pressed, the accelerator actuator is operated by a hydraulic pressure introduced through a hydraulic line, the first head, the moving bar, and the side bar move together in the first direction, the guide of the side bar hits the rotary bar from a back side, and the rotary bar rotates counterclockwise to allow the driving bar to be pressurized by the first spring and to move in the first direction.

5. The power transmission device of claim 3, wherein when the brake pedal is pressed, the brake actuator is operated by a hydraulic pressure introduced through a hydraulic line, the second head, the moving bar, and the side bar move together in the second direction; and the rotary bar is pressurized by the second spring and moves in the first direction.

* * * * *